US010671887B2

(12) United States Patent
Danielsson et al.

(10) Patent No.: US 10,671,887 B2
(45) Date of Patent: Jun. 2, 2020

(54) BEST IMAGE CROP SELECTION

(71) Applicant: Axis AB, Lund (SE)

(72) Inventors: Niclas Danielsson, Lund (SE); Markus Skans, Lund (SE)

(73) Assignee: Axis AB, Lund (SE)

( * ) Notice: Subject to any disclaimer, the term of this patent is extended or adjusted under 35 U.S.C. 154(b) by 266 days.

(21) Appl. No.: 15/831,638

(22) Filed: Dec. 5, 2017

(65) Prior Publication Data

US 2019/0171910 A1 Jun. 6, 2019

(51) Int. Cl.
*G06K 9/62* (2006.01)
*G06K 9/66* (2006.01)
*G06K 9/00* (2006.01)
*G06K 9/46* (2006.01)

(52) U.S. Cl.
CPC ....... *G06K 9/6256* (2013.01); *G06K 9/00771* (2013.01); *G06K 9/4628* (2013.01); *G06K 9/6202* (2013.01); *G06K 9/66* (2013.01)

(58) Field of Classification Search
CPC ............. G06K 9/00771; G06K 9/4628; G06K 9/6202; G06K 9/6256; G06K 9/66
See application file for complete search history.

(56) References Cited

U.S. PATENT DOCUMENTS

| 8,139,817 | B2 | 3/2012 | Laganière et al. |
| 8,494,283 | B2 | 7/2013 | Joshi et al. |
| 8,879,802 | B2 | 11/2014 | Yamada |
| 2006/0093208 | A1 | 5/2006 | Li et al. |
| 2006/0153429 | A1 | 7/2006 | Gehlen et al. |
| 2009/0310828 | A1* | 12/2009 | Kakadiaris ........... G06K 9/4661 382/118 |
| 2010/0111376 | A1* | 5/2010 | Yan .................... G06K 9/00268 382/118 |

(Continued)

FOREIGN PATENT DOCUMENTS

| CN | 104902218 A | 9/2015 |
| WO | 2012109712 A1 | 8/2012 |

OTHER PUBLICATIONS

Grother et al. ("Performance of biometric quality measures," IEEE Transaction on Pattern Recognition and Machine Intelligence, vol. 29, No. 4, Apr. 2007) (Year: 2007).*

(Continued)

*Primary Examiner* — Yubin Hung
(74) *Attorney, Agent, or Firm* — Mollborn Patents, Inc.; Fredrik Mollborn

(57) ABSTRACT

Methods and apparatus, including computer program products, for creating a quality annotated training data set of images for training a quality estimating neural network. A set of images depicting a same object is received. The images in the set of images have varying image quality. A probe image whose quality is to be estimated is selected from the set of images. A gallery of images is selected from the set of images. The gallery of images does not include the probe image. The probe image is compared to each image in the gallery and a match score is generated for each image comparison. Based on the match scores, a quality value is determined for the probe image. The probe image and its associated quality value are added to a quality annotated training data set for the neural network.

15 Claims, 7 Drawing Sheets

(56) References Cited

U.S. PATENT DOCUMENTS

| | | | |
|---|---|---|---|
| 2011/0058743 A1* | 3/2011 | Myers | G06F 16/5838 382/190 |
| 2012/0288165 A1 | 11/2012 | Bedros et al. | |
| 2013/0195316 A1 | 8/2013 | Bataller et al. | |
| 2013/0236068 A1* | 9/2013 | Eshghi | G06K 9/00288 382/118 |
| 2014/0044348 A1 | 2/2014 | Chen et al. | |
| 2017/0161550 A1* | 6/2017 | Ranganath | G06K 9/00288 |
| 2017/0177979 A1* | 6/2017 | Chokshi | G06K 9/036 |
| 2017/0294010 A1* | 10/2017 | Shen | G06K 9/6256 |
| 2019/0147226 A1* | 5/2019 | Yip | G06K 9/00228 382/118 |

OTHER PUBLICATIONS

Klare et al. ("Pushing the frontiers of unconstrained face detection and recognition: IARPA Janus Benchmark A," IEEE Proc. CVPR, 2015) (Year: 2015).*

Hong et al. ("Online Facial Recognition Based on Personalized Gallery," Proceedings of International Conference on Automatic Face and Gesture Recognition, Apr. 1997) (Year: 1997).*

Tabassi et al. ("A Novel Approach to Fingerprint Image Quality," IEEE Int'l Conf. on Image Processing, Sep. 14, 2005) (Year: 2005).*

European Search Report; Application No./Patent No. 17205654.1-1207; European Patent Office 80298 Munich, Germany; Jun. 21, 2018; pp. 1-8.

Hsu, Winston H.; "Investigating Data Augmentation Strategies for Advancing Deep Learning Training"; Professor, National Taiwan University Director, NVIDIA AI Lab (NTU); Mar. 26, 2018; pp. 1-31.

Lacey Best-Rowden et al: "Automatic Face Image Quality Prediction"; Arxiv.org, Cornell University Library, 201 Olin Library Cornell University Ithaca, NY 14853; Jun. 29, 2017 (Jun. 29, 2017); pp. 1-13.

Thomas R. Thompson et al: "Captive Rearing Sage-Grouse for Augmentation of Surrogate Wild Broods: Evidence forSuccess"; The Journal of Wildlife Management; Aug. 31, 2015 (Aug. 31, 2015); pp. 998-1013.

Pan C, et al. "Recognition Oriented Facial Image Quality Assessment via Deep Convolutional Neural Network." Proceeding; ICIMCS'16 Proceedings of the International Conference on Internet Multimedia Computing and Service. pp. 160-163. 2016.

European Office Action; European Patent Office; Application No. 17 205 654.1-1207; dated Apr. 1, 2019. pp. 1-5.

* cited by examiner

BEST IMAGE CROP SELECTION

BACKGROUND

The present invention relates to identifying or re-identifying objects in a series of images captured by a camera, and more specifically to training a neural network to select a best image among a series of images for identification or re-identification purposes.

Monitoring cameras are used in many different applications, both indoors and outdoors, to monitor a variety of environments. One important aspect of the monitoring relates to the ability to identify or re-identify objects or people. For example, for law enforcement purposes, it may be of interest to identify whether a particular car enters or exists a monitored area, or determining whether images of two vehicles recorded at different times or places are actually the same vehicle. Similarly, it may be of interest to be able to identify specific persons or faces, both to make an initial determination as to who the person might be, or to determine whether the person has been seen before in a different monitoring situation.

There are two main categories of monitoring cameras; single-shot cameras and video cameras. The single-shot cameras typically take a single picture when triggered by some kind of sensor, such as a motion sensor, whereas video cameras continuously record the movement of an object as a series of images, also referred to as an "object track."

Performing re-identification based on images from single-shot cameras typically involve using exactly one image crop of an object or person to be matched to another single image crop, to check whether both image crops represent the same person. An image crop, as used herein, refers to a region of an image recorded by a camera. Typically, the image crop is done in such a way that the image crop mainly contains pixels depicting the object or person.

However, in a video surveillance situation, selecting images for re-identification of an object becomes more complex. First, it is necessary to determine which collection of image crops belongs to the same (yet unknown) object. One way to accomplish this is to use an object tracker, such as a motion based or feature based object tracker. There are several kinds of motion-based and other object tracking techniques that are well known to those having ordinary skill in the art. Second, determining which image crop out of the whole object track to select for re-identification purposes poses another problem. There are a variety of problems that could occur with individual images in an object track. For example, some of the images might be of too low quality to be useful, for example, due to motion blur that occurs in an image frame; angular or lighting changes; when an object or person enters the camera view, not all of the person or object is yet visible for the first several frames in the object track, etc.

Yet further, it is impossible to know how many frames to wait before selecting an image crop, because it is not possible to predict what the object or person will do. May be the object will remain at the border of the camera view for a long time, or may be the object will pass through the camera view very quickly. Therefore, merely assigning a fixed delay before selecting the image crop is not a solution that would work very well. For at least these reasons, it is clear that there is a need for better techniques for deciding which image crop to select from an object track for identification or re-identification of objects or people.

SUMMARY

According to a first aspect, the invention relates to a method, in a computer system, for creating a quality annotated training data set of images for training a quality estimating neural network. The method includes:

receiving a set of images depicting a same object, wherein the images in the set of images have varying image quality;

selecting, from the set of images, a probe image whose quality is to be estimated;

selecting, from the set of images, a gallery of images, wherein the gallery of images does not include the probe image;

comparing the probe image to each image in the gallery and generating a match score for each image comparison;

determining, based on the match scores, a quality value for the probe image; and adding the probe image and its associated quality value to a quality annotated training data set for the neural network.

This provides a way of automatically creating a quality annotated training data set of images for training a quality estimating neural network. Using this annotated training data set allows the neural network to learn what constitutes a "good" image for purposes of identification or re-identification. Automating the creation of the training data set results in significant time savings compared to manual training data set creation, and also provides a training data set that does not include any subjectivity, which otherwise would be the case had the training data set been created manually. The method can be based on, and tailored specifically to, the performance of a particular re-identification matching algorithm. This also means that the quality annotation can be re-run to improve the quality labeling, should the re-identification algorithm performance change.

According to one embodiment the receiving, selecting, selecting, comparing and determining steps are repeated for each image in the first set of images, and all the probe images and their respective associated quality values are used as the quality annotated training data set for the neural network. By having a larger training data set to provide to the neural network, it is possible to train the neural network so that the neural network can perform image selection from object streams with greater accuracy, compared to when only a small training data set is available.

According to one embodiment, the object can be a person, a vehicle, or a face. While these are some examples of objects that are commonly encountered in identification and re-identification scenarios, it should be noted that there is a wide range of objects for which the techniques in accordance with the various embodiments of the invention can be used.

According to one embodiment, comparing the probe image to each image in the gallery of images can include determining a distance between a first feature vector representing the probe image and a second feature vector representing a gallery image, and assigning a match score based on the distance between the first feature vector and the second feature vector. Feature vectors are well known to those having ordinary skill in the art, and provide a convenient way of representing an object and making comparisons between two images, as the features of the object can be numerically represented.

According to one embodiment, a short distance between the feature vectors indicates a high degree of identity similarity between the probe image and the gallery image. This makes it easy to convert the determined distance into a match score that indicates how well the probe image matches the gallery image, without having to do any extra calculations. Identity similarity is different from "pixel similarity" in that the identity similarity may be significant even when the objects in the probe image and the gallery image, respectively, have very different poses or when the objects are viewed from different angles, whereas the pixel difference between the two images in such a case may be very large.

According to one embodiment, the quality value for the probe image is determined as a function of a best match score for the probe image. For example, the best match score itself can be used as the quality value for the probe image. This provides a simple way to determine the quality of a probe image without having to perform any additional calculations.

According to one embodiment, the quality annotated training data set is configured to be used to train the neural network for identification or re-identification purposes. Having a well-trained neural network based on non-subjective data enables accurate identification or re-identification of objects and people in a variety of circumstances.

According to a second aspect, the invention relates to a system for creating a quality annotated training data set of images for a neural network. The system includes a memory and a processor. The memory contains instructions that when executed by the processor causes the processor to perform a method that includes:
  receiving a set of images depicting a same object, wherein the images in the set of images have varying image quality;
  selecting, from the set of images, a probe image whose quality is to be estimated;
  selecting, from the set of images, a gallery of images, wherein the gallery of images does not include the probe image;
  comparing the probe image to each image in the gallery and generating a match score for each image comparison;
  determining, based on the match scores, a quality value for the probe image; and
  adding the probe image and its associated quality value to a quality annotated training data set for the neural network.

The system advantages correspond to those of the method and may be varied similarly.

According to a third aspect, the invention relates to a computer program for creating a quality annotated training data set of images for a neural network. The computer program contains instructions corresponding to the steps of:
  receiving a set of images depicting a same object, wherein the images in the set of images have varying image quality;
  selecting, from the set of images, a probe image whose quality is to be estimated;
  selecting, from the set of images, a gallery of images, wherein the gallery of images does not include the probe image;
  comparing the probe image to each image in the gallery and generating a match score for each image comparison;
  determining, based on the match scores, a quality value for the probe image; and
  adding the probe image and its associated quality value to a quality annotated training data set for the neural network.

The computer program involves advantages corresponding to those of the method and may be varied similarly.

The details of one or more embodiments of the invention are set forth in the accompanying drawings and the description below. Other features and advantages of the invention will be apparent from the description and drawings, and from the claims.

BRIEF DESCRIPTION OF THE DRAWINGS

Like reference symbols in the various drawings indicate like elements.

DETAILED DESCRIPTION

As was described above, one goal with the various embodiments of the invention is to be able to automatically select a best image from a set of images depicting an object track of an object, such that the selected image can be used in identification or re-identification of the object. One way to perform such an automatic selection of an image is to use a neural network, such as a convolutional neural network (CNN). However, in order for the neural network to be able to do select the best image from the object track, the neural network must first be trained such that the neural network has some ground truth about what constitutes a "best" picture for identification or re-identification purposes.

One conventional technique for training a neural network to achieve this involves feeding the neural network images whose quality with respect to identification or re-identification purposes have been manually labeled by humans. For example, some factors affecting how successful a re-identification include:
  Images that are semi-dark, dark, very dark (one or both images)
  Images that have semi-distinct, distinct color (e.g., on the clothes of a person in one or both images).
  One of the images having a semi-distinct color in the background.
  Blurry images.
  Textures (e.g., very characteristic texture such as a square-patterned shirt, may yield a more accurate match).
  Bad image crops (e.g., something cut off or an additional person in the image, etc.)

While these are all factors that could be evaluated by a person and be used to manually assign a quality value for the images to be used in training the neural network, such a process would be both labor and time consuming and would also include a significant amount of subjectivity by the person assigning the quality values.

Therefore, the various embodiments described herein pertain to methods, systems and computer program products for automatically providing a set of annotated training images, which can be used to train the neural network to establish a "ground truth," such that the neural network subsequently may select a "best" image, or select a number of images having an image quality above a certain threshold, from a series of images representing an object track for identification or re-identification purposes. A method in accordance with one embodiment of the invention will now be described by way of example and with reference to FIGS. 1 and 2A-2E.

Figure 1:
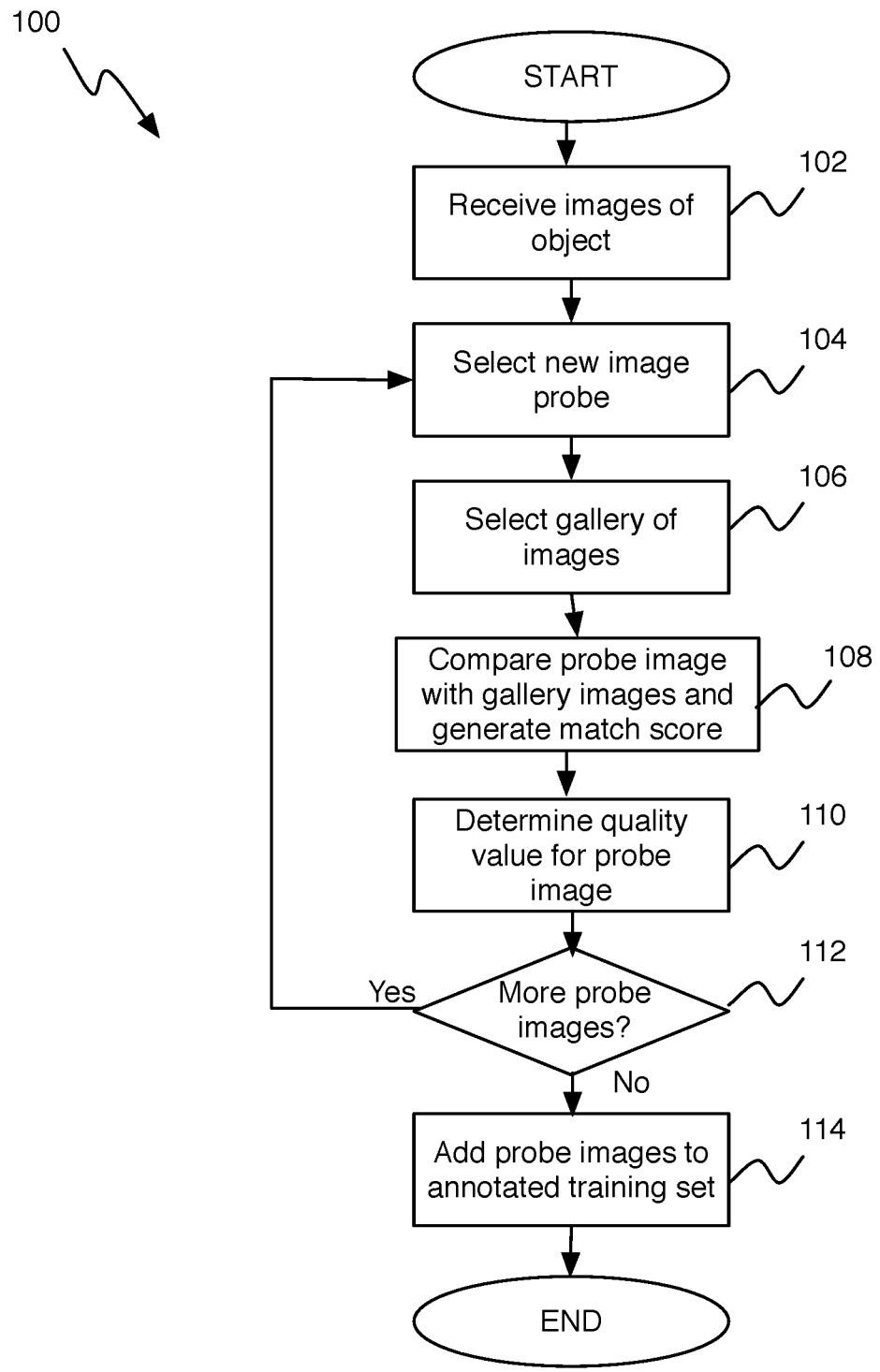
FIG. 1 shows a process 100 for creating an annotated training set of images for a neural network, in accordance with one embodiment.
Figure 2A:
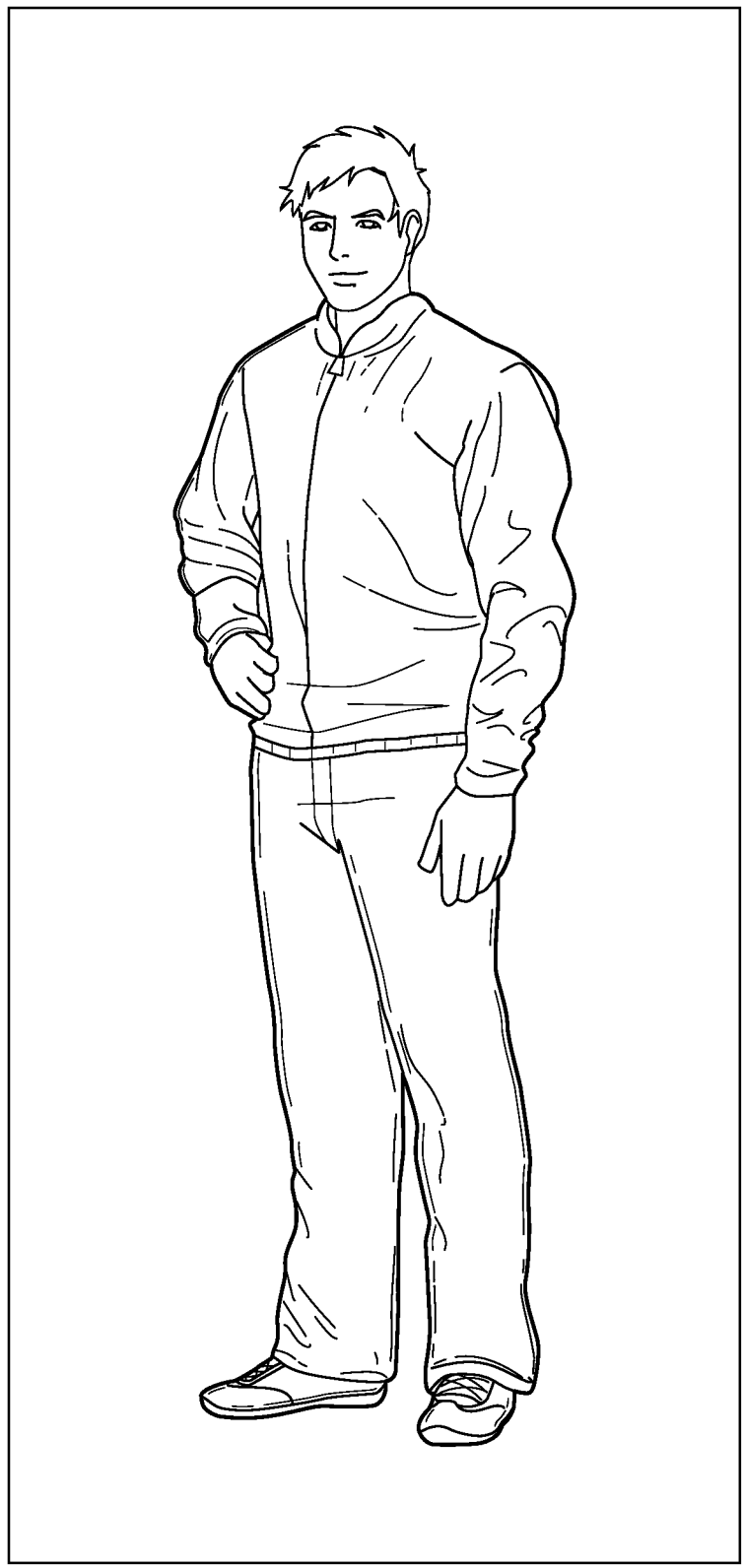
FIGS. 2A-2E show schematic images of varying quality, in accordance with one embodiment.
Figure 2B:
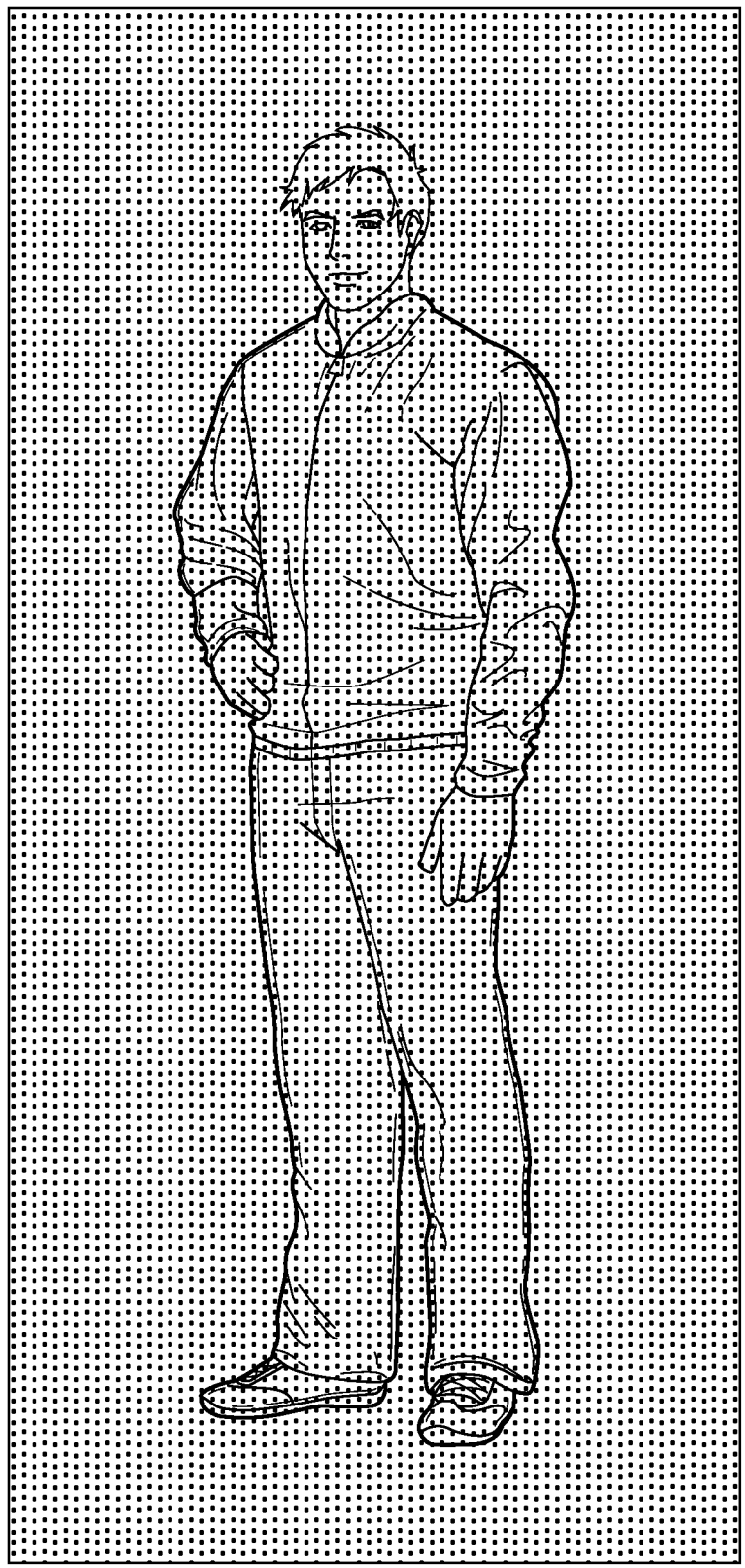
Figure 2C:
Figure 2D:
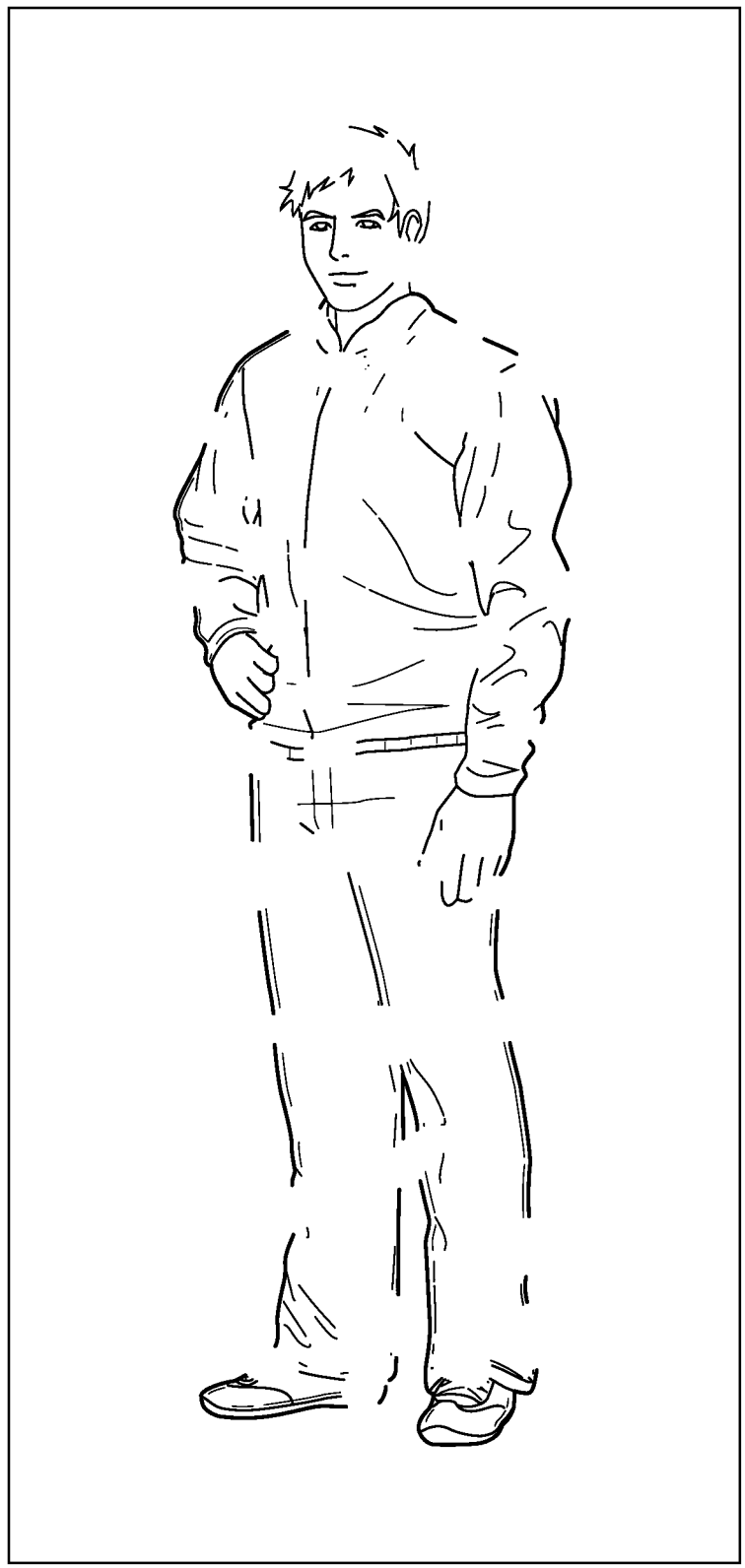
Figure 2E:
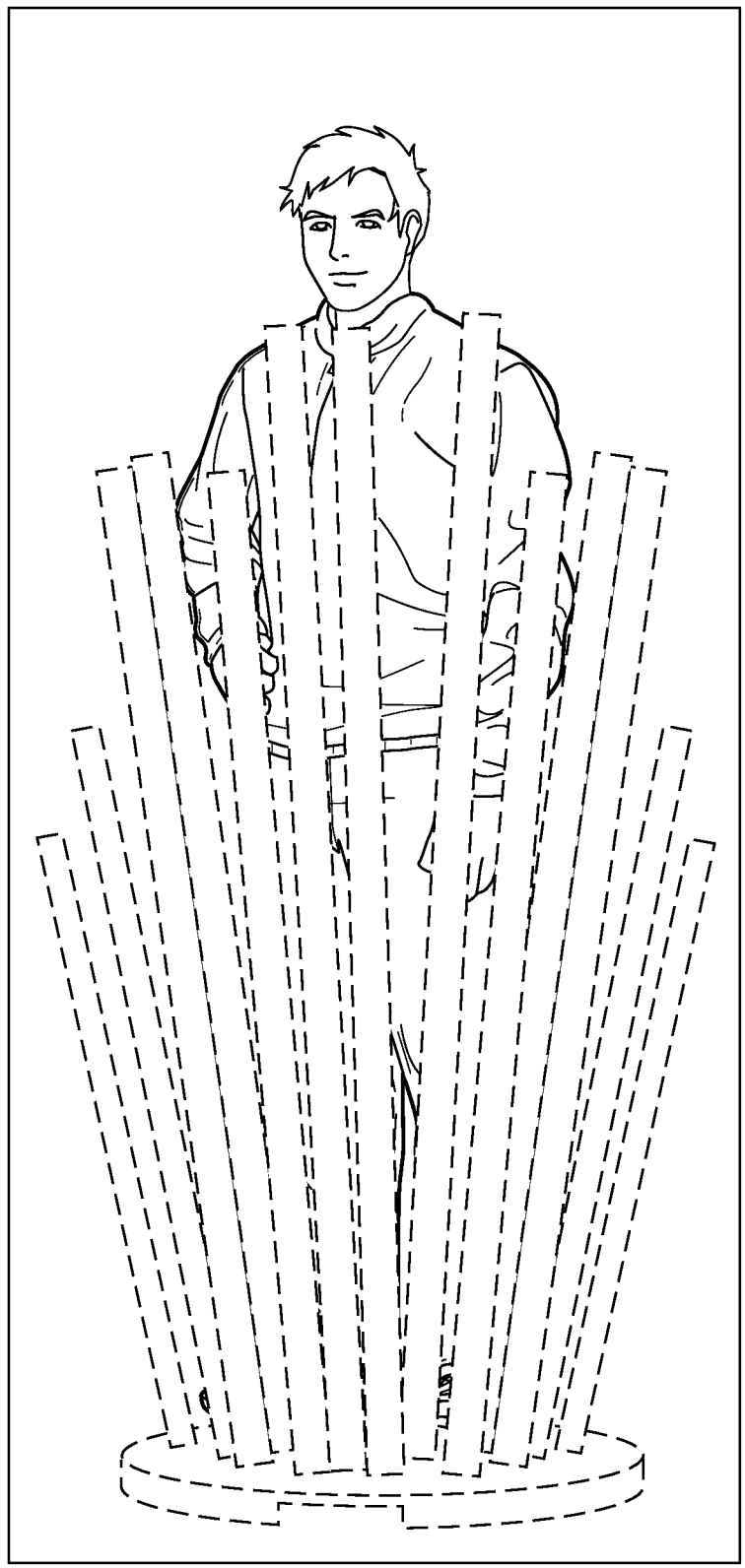

As can be seen in FIG. 1, the method 100 starts by receiving a set of images depicting the same object, step 102. The images in the set of images have varying image quality. Some schematic examples of images in the set of images can be seen in FIGS. 2A-2E. For example, FIG. 2A shows an image of good quality, with good lighting and clear contrasts with the background. FIG. 2B shows an image in which the lighting is poor. FIG. 2C shows an image in which the object and background have similar colors and/or patterns, which makes it more difficult to distinguish the object from the background. FIG. 2D shows an image in which the object is blurry, and FIG. 2E shows an image in which the image crop is bad, i.e., the object is partially obscured by another object.

Next, a probe image whose quality is to be estimated is selected from the set of images, step 104. A gallery of images is also selected from the set of images, step 106. The gallery of images does not include the probe image, and the size of the gallery can be small, e.g., only a few images in the set of images, or be as large as every image in the set of images, besides the probe image itself. Typically, a larger size of gallery is preferred as a large gallery is more likely to provide a larger variation of image qualities compared to a small gallery. However, large galleries may also lead to longer processing times for the quality labeling of the images, so it is also important to balance the benefits of a large size gallery with the drawbacks of a longer processing time when deciding on a size of gallery.

After selecting the probe image and the gallery, the probe image is compared to every picture in the gallery and a match score is generated for each image comparison, step 108. For example, when a good quality probe image is compared to a good quality gallery image of the same object, a good match score will be generated. Correspondingly, when a bad quality probe image is compared to a bad quality gallery image of the same object, a poor match score will be generated. When a good quality probe image (for example, a probe image of good lighting quality with texture, color and details being easily distinguishable) is compared to a poor quality gallery image (for example, an extremely dark gallery picture showing only a silhouette and having no other distinguishable characteristics) of the same object, the image comparison would generate a low match score, or at least a match score that is considerably worse compared to the good/good comparison, despite the probe image itself being a "good" image. Therefore, when the probe image is compared with every gallery image, a collection representing a range of match scores is obtained, and the collection of match scores for the individual image pairs can give an indication of the quality of the probe image.

In one embodiment, the match score can be determined, for example, by determining a distance between a first feature vector, that is, an n-dimensional vector of numerical features that represent the object in probe image, and a second feature vector that represents the object in the gallery image. A small distance between the two feature vectors indicates a good match and results in a high match score, while a large distance between the two feature vectors indicate a poor match, and results in a low match score.

Next, the match scores are used to determine a quality value of the probe image, step 110. For example, if the gallery contains images that exhibit a large variation in quality, the maximum of the match scores can be taken as the quality value of the probe image. That is, if the probe image is of high quality, it will have some high match scores (when the gallery images are also of high quality), and a high quality value can be assigned. However, if the probe image is of poor quality, all the match scores will be poor, and thus the quality value of the probe image will be lower. As the skilled person realizes, this is merely one way of determining a quality value for a probe image, and many other variations can be envisioned by those having ordinary skill in the art. For example, in some embodiments the average match score of the probe image can be used as an alternative to using the maximum score. However, this may work better with a small gallery having a large variation (possibly in combination with a stricter requirement on the variation in quality being large enough for the images in the gallery), whereas the max-score strategy may work with any gallery size.

After comparing the probe image to all the images in the gallery, the process checks whether there are any other probe images for which an image quality value should be determined, step 112. Typically, most, if not all, images in the set of images are selected as probe images, such that a large set of training data can be obtained. If there are more probe images, the process returns to step 104, and proceeds as outlined above. If there are no more probe images, the process continues to step 114, in which the probe images along with their quality values are added to a training data set that can subsequently be used to train a quality estimating neural network, which ends the process.

It should be noted that in some embodiments, several galleries may be used, and the range in quality values of the probe images for individual galleries can be used to give an indication of the quality of the individual gallery as a whole. For example, if the range of quality values for each individual probe image is large, this indicates that the gallery contains images that exhibit a wide range of qualities. Therefore, the best probe image from such a gallery is likely to be more "reliable" than a best probe image that comes from a gallery that exhibits a smaller variation between the images (e.g., a gallery where all images might be of "average" or poor quality, despite having high match scores with each probe image, and thereby a high absolute quality value). Thus, the poor gallery can be discarded and the good gallery can be used for training the quality estimating neural network.

After the quality estimating neural network has learned what constitutes a "good" image, the neural network can decide which image crop to select from an object track when doing single-shot, open-set, identification or re-identification of objects or people. Typically, such identification or re-identification can be used to identify vehicles, people, or faces, but a wide range of applications are available, such as identifying bags, pets, or any other objects that might be of interest in different situations.

In some embodiments, the identification or re-identification can also include an update scheme, so that an identification or re-identification can start as soon as an object track starts, and then get updated with better estimates as the track evolves and "better" images can be identified as images of an active object track arrives from a camera. For example, in some embodiments, single-shot re-identification can be averaged and used on a set of images. In other embodiments, temporal analysis can be performed on a sub-track having a quality above a certain threshold, or the best sub-track of a given length. As the skilled person realizes, many variations are possible.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
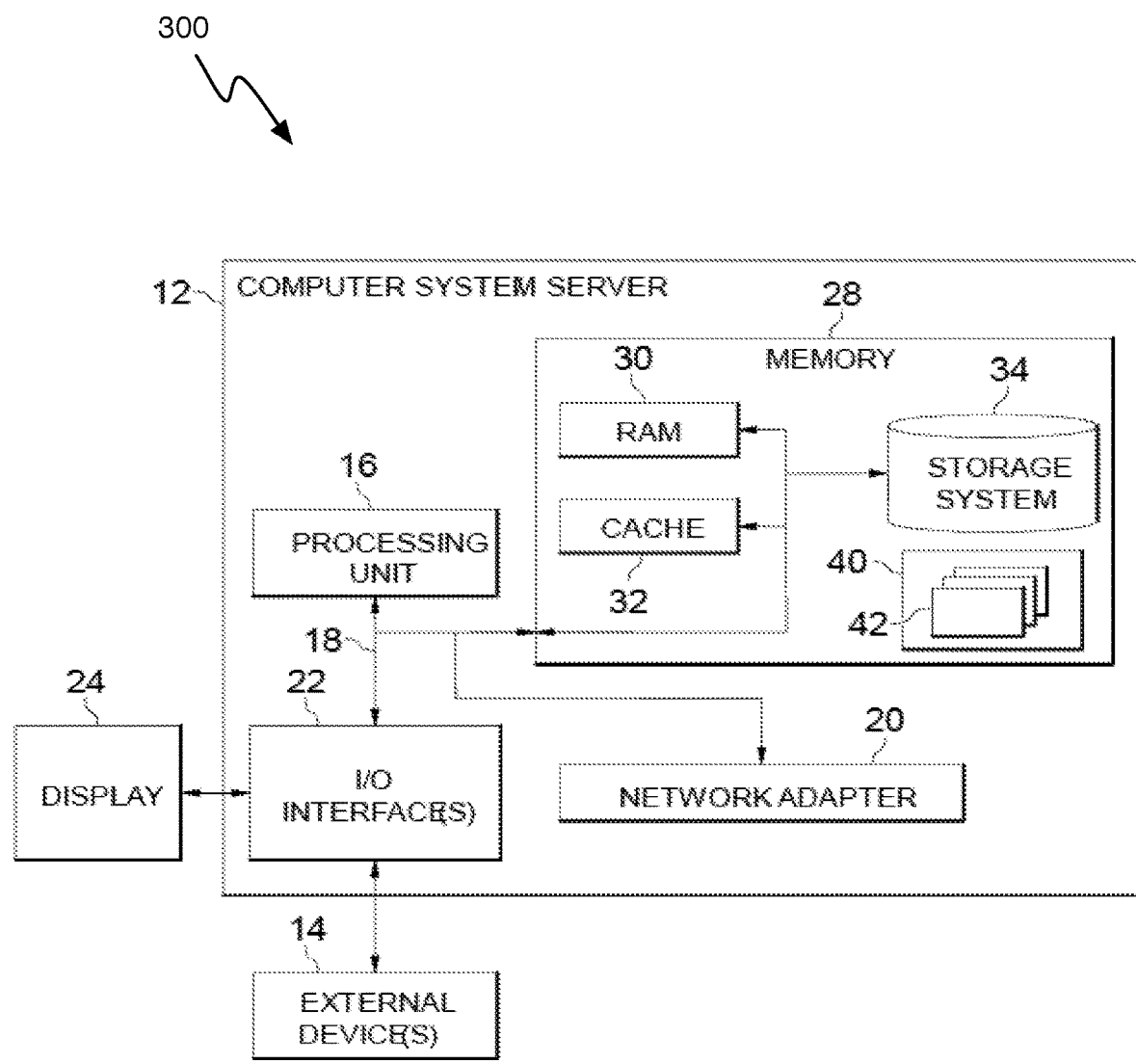
FIG. 3 shows a schematic diagram of a computer system 300 for creating an annotated training set of images for a neural network, in accordance with one embodiment.

FIG. 3 shows a schematic view of a computer system in which various embodiments of the present invention can be implemented. As shown in FIG. 3, the computer system 12 may include, but is not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system/server 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, and redundant processing units.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Thus, many other variations that fall within the scope of the claims can be envisioned by those having ordinary skill in the art.

The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for creating a quality annotated training data set of images for training a quality estimating neural network, comprising:
   receiving a set of images depicting a same object, wherein the images in the set of images have varying image quality;
   selecting, from the set of images, a probe image whose quality is to be estimated;
   selecting, from the set of images, a gallery of images, wherein the gallery of images does not include the probe image;
   comparing the probe image to each image in the gallery and generating a match score for each image comparison;
   determining, based on the match scores, a quality value for the probe image; and
   adding the probe image and its associated quality value to a quality annotated training data set for the neural network.

2. The method of claim 1, further comprising:
   repeating the selecting, selecting, comparing, determining and adding steps for each image in the set of images.

3. The method of claim 1, wherein the object is one of: a person, a vehicle, and a face.

4. The method of claim 1, wherein comparing the probe image to each image in the gallery of images includes:
   determining a distance between a first feature vector representing the probe image and a second feature vector representing a gallery image; and
   assigning a match score based on the distance between the first feature vector and the second feature vector.

5. The method of claim 4, wherein a short distance indicates a high degree of identity similarity between the probe image and the gallery image.

6. The method of claim 1, wherein the quality value for the probe image is determined as a function of a best match score for the probe image and the range of match scores for the probe image.

7. A system for creating a quality annotated training data set of images for training a quality estimating neural network, comprising:
   a memory; and a processor,
   wherein the memory contains instructions that when executed by the processor causes the processor to perform a method that includes:
     receiving a set of images depicting a same object, wherein the images in the set of images have varying image quality;
     selecting, from the set of images, a probe image whose quality is to be estimated;
     selecting, from the set of images, a gallery of images, wherein the gallery of images does not include the probe image;
     comparing the probe image to each image in the gallery and generating a match score for each image comparison;
     determining, based on the match scores, a quality value for the probe image; and
     adding the probe image and its associated quality value to a quality annotated training data set for the neural network.

8. The system of claim 7, wherein the method further comprises:
   repeating the selecting, selecting, comparing, determining and adding steps for each image in the set of images.

9. The system of claim 7, wherein the object is one of: a person, a vehicle, and a face.

10. The system of claim 7, wherein comparing the probe image to each image in the gallery of images includes:
   determining a distance between a first feature vector representing the probe image and a second feature vector representing a gallery image; and
   assigning a match score based on the distance between the first feature vector and the second feature vector.

11. The system of claim 10, wherein a short distance indicates a high degree of identity similarity between the probe image and the gallery image.

12. The system of claim 7, wherein the quality value for the probe image is determined as a function of a best match score for the probe image and the range of match scores for the probe image.

13. A computer program product for creating a quality annotated training data set of images for training a quality estimating neural network, comprising a computer readable storage medium having program instructions embodied therewith, wherein the computer readable storage medium is not a transitory signal per se, the program instructions being executable by a processor to perform a method comprising:
   receiving a set of images depicting a same object, wherein the images in the set of images have varying image quality;
   selecting, from the set of images, a probe image whose quality is to be estimated;
   selecting, from the set of images, a gallery of images, wherein the gallery of images does not include the probe image;
   comparing the probe image to each image in the gallery and generating a match score for each image comparison;
   determining, based on the match scores, a quality value for the probe image; and
   adding the probe image and its associated quality value to a quality annotated training data set for the neural network.

14. The computer program product of claim 13, wherein the method further comprises:
   repeating the selecting, selecting, comparing, determining and adding steps for each image in the set of images.

15. The computer program product of claim 13, wherein comparing the probe image to each image in the gallery of images includes:
   determining a distance between a first feature vector representing the probe image and a second feature vector representing a gallery image; and
   assigning a match score based on the distance between the first feature vector and the second feature vector.

* * * * *